United States Patent [19]

MacKay

[11] 4,239,699
[45] Dec. 16, 1980

[54] SULFONAMIDOPHENOLS, METAL COMPLEXES THEREOF, AND SOLUTIONS CONTAINING SUCH COMPOUNDS FOR USE IN EXTRACTION OF METAL VALUES

[75] Inventor: Kenneth D. MacKay, Circle Pines, Minn.

[73] Assignee: Henkel Corporation, Minneapolis, Minn.

[21] Appl. No.: 909,224

[22] Filed: May 24, 1978

[51] Int. Cl.³ ............... C07C 143/78; C07C 143/79; B01D 11/04

[52] U.S. Cl. .................. 564/92; 260/429.9; 260/438.1; 260/439 R; 260/465 E; 423/24; 423/100; 423/139; 252/182

[58] Field of Search ............... 252/182; 423/24, 100, 423/139; 260/465 E, 556 AR, 556 B

[56] References Cited

U.S. PATENT DOCUMENTS

| | | | |
|---|---|---|---|
| 3,179,669 | 4/1965 | Ursprung | 260/556 AR X |
| 3,818,078 | 6/1974 | Bard | 260/556 AR X |
| 3,928,355 | 12/1975 | Lee | 260/556 AR X |
| 3,954,936 | 5/1976 | Shozda | 423/24 |
| 4,013,621 | 3/1977 | Knell | 260/556 AR X |
| 4,160,807 | 7/1979 | Virnig et al. | 423/24 |

FOREIGN PATENT DOCUMENTS 42-10215  6/1967  Japan .................. 260/556 AR

OTHER PUBLICATIONS

Gordinskii et al., CA 61:8229g (1964).
Titov et al., CA 77:5220w (1972).

*Primary Examiner*—Thomas A. Waltz
*Attorney, Agent, or Firm*—Patrick J. Span

[57] ABSTRACT

Certain sulfonamidophenols, metal complexes thereof and solutions of said compounds in essentially water-immiscible, liquid hydrocarbon solvents are disclosed. The sulfonamidophenols have the structural formula:

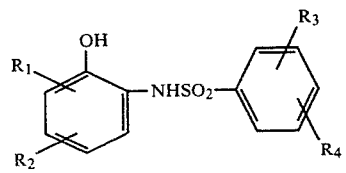

wherein $R_1$, $R_2$, $R_3$ and $R_4$ are as defined in the specification and claims hereof. Particular metal values are recovered from their aqueous solutions by using sulfonamidophenols dissolved in essentially water-immiscible liquid hydrocarbon solvents. The extraction process involves contacting the metal value containing aqueous solution with the solution of sulfonamidophenol in essentially water-immiscible liquid hydrocarbon solvent and stripping the metal values from the loaded organic phase.

32 Claims, No Drawings

SULFONAMIDOPHENOLS, METAL COMPLEXES THEREOF, AND SOLUTIONS CONTAINING SUCH COMPOUNDS FOR USE IN EXTRACTION OF METAL VALUES

The present invention is directed to novel sulfonamidophenols, organic solvent solutions thereof, metal complexes of such sulfonamidophenols, organic solvent solutions of such complexes and the method of using said sulfonamidophenols to extract metal values from aqueous solution.

Liquid ion exchange recovery of metal values from aqueous solutions thereof has in the past ten years or so become a mature commercial operation. Such processing has been described as being deceptively simple since all that is really happening is the transfer of a metal value from Phase A (aqueous) to Phase B (organic) and thence from Phase B to Phase C (aqueous). However, complexities of liquid ion exchange arise in a number of areas including (1) synthesis and manufacture of the reagent system, (2) evaluation of the system's capabilities, and (3) engineering application leading to large scale metal recovery.

The key to a successful application of liquid ion exchange is the reagent. In this respect, the reagent should desirably meet a number of criteria. In the first instance, the reagent should complex with or react with a metal or group of metals and such complexing or reaction should be relatively fast in order to avoid having to use large holding tanks or reaction vessels. It is also desirable that the reagent exhibits preference for a single metal where the aqueous starting solutions contain a number of metal values. Such selectivity can often be optimized at designated pH ranges. The reagent should also desirably complex or react quantitatively with the metal under the extraction conditions. Additionally, the reagent, as well as the resulting metal complex, must exhibit satisfactory solubility in the essentially water-immiscible organic solvent being used. Further, the reagent-metal reaction or complexing should be reversible so that the metal can be stripped from the organic phase. For economic reasons, the reagent should be relatively stable so that it can be recycled repeatedly. Also, it should be essentially water insoluble to prevent significant loss into the aqueous phase or phases. Furthermore, the reagent should not cause or stabilize emulsions. Again and principally for economic reasons, the reagent should not react with or load significant quantitites of acid, for example, from aqueous acidic stripping solutions. And, of course, the cost of the reagent should be such that the liquid ion exchange process can be operated at a profit.

Of significant, but lesser, importance, is the selection of the essentially water-immiscible solvent to be used in the liquid ion exchange process. Such selection is important principally from a cost standpoint, especially in the recovery of the more common metals. Existing commercial operations for copper recovery, for example, generally employ aliphatic kerosenes because of the low cost thereof. Thus the cost of the reagent and the solvent is intertwined in providing the desired overall economics of the process being commercialized.

One of the most extensively used systems in commercial operation in the last decade for copper recovery has employed benzophenoximes or combination reagents including a benzophenoxime component. While being economic, improvements can be made since the said benzophenoximes do not have total selectivity for copper over iron, for example. Other types of reagents which have been proposed for use in copper recovery such as the alkenyl substituted 8-hydroxyquinolines also have certain drawbacks.

More recently, novel sulfonamidoquinolines, particularly useful in liquid ion exchange metal recovery processes were discovered. These compounds and their use in liquid ion exchange metal recovery processes are the subject of commonly assigned co-pending applications Ser. Nos. 843,534 and 845,932, now abandoned. The applications further make reference to certain low molecular weight sulfonamidoquinolines as reported by Billman and Chernin in Analytical Chemistry, Vol. 34, No. 3, March 1962, pp. 408–410 and U.S. Pat. Nos. 3,268,538 and 3,337,555.

It has now been discovered that certain novel sulfonamidophenols as more fully defined hereinafter are useful in liquid ion exchange recovery processes. The new compounds of the present invention have the following structural formula:

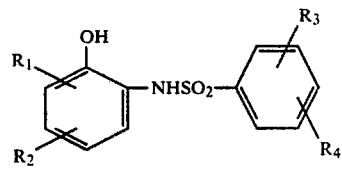

wherein $R_1$ and $R_2$, which may be the same or different, are hydrogen, alkyl, alkenyl, halogen, nitro, cyano, trifluoromethyl and methylsulfonyl, and $R_3$ and $R_4$, which may be the same or different, are hydrogen, alkyl or alkenyl. When alkyl or alkenyl, The R groups contain from 1 to 120 carbon atoms and preferably at least eight carbon atoms. Additionally, the alkyl and alkenyl groups may be linear or branched chain, although branched chain is preferred.

The compounds of the present invention are also characterized as having solubilities in essentially water-immiscible liquid hydrocarbon solvents of at least 2% by weight. Correspondingly, they are further characterized in that the copper ($Cu++$) complexes of the compound have solubilities of at least 2% by weight in the said water-immiscible, liquid hydrocarbon solvents. Especially preferred compounds of the invention are those which exhibit solubilities of at least 2% by weight in both pure and complexed form, in aliphatic or aromatic hydrocarbons, or mixtures thereof, having flash points of at least 150° F. Thus, the compounds of the invention may preferably be further characterized as having substituents containing a sufficient number of carbon atoms and/or branching in the alkyl and alkenyl groups to provide at least the minimum 2% solubility in the aforementioned solvents.

The preference for alkyl and alkenyl substituents containing at least 8 carbon atoms and/or possessing a branched chain structure is due to their contribution to the solubilities of the compounds in the above described solvents. The beneficial effect provided by the number of carbon atoms is obtained by having an alkyl or alkenyl substituent of at least 8 carbon atoms or more than one alkyl or alkenyl substituent in which the sum of the carbon atoms is at least 8. Accordingly, the most preferred compounds of the present invention are those possessing a branched chain alkyl or alkenyl substituent having at least 8 carbn atoms or those possessing branched chain alkyl or alkenyl substituents in which the sum of the carbon atoms is at least 8. Particularly preferred compounds are those containing a dodecyl or a decyl and methyl substituent.

The novel compounds of the present invention are prepared by first placing the appropriate aminophenol in pyridine and cooling the mixture to 10° to 15° C. The substituted benzenesulfonyl chloride is then added slowly over a 30 to 60 minute period with stirring while maintaining the temperature at 10° to 15° C. The molar ratio of aminophenol to sulfonyl chloride is approximately equal to one. The reaction mixture is allowed to warm to room temperature for approximately two hours and then heated at 80° C. for one and one-half hours. After cooling to room temperature, the organic phase is diluted with a solvent such as diethyl ether or heptane and washed with dilute hydrochloric acid followed by water. After drying the organic phase with an anhydrous salt such as sodium sulfate, the volatiles are removed by evaporation under reduced pressure leaving the sulfonamidophenol product.

The starting materials for the preparation of the novel sulfonamidophenols of the present invention may be prepared (if not commercially available) as follows. The starting aminophenol is prepared by reduction of the corresponding nitrophenol. The starting substituted benzenesulfonyl chlorides may be prepared from the corresponding alkylbenzene, alkylbenzenesulfonic acid, sodium sulfonate salt of alkyl halide, as described in commonly assigned co-pending applications Ser. Nos. 843,534 and 845,932, now abandoned, which disclosures are hereby incorporated by reference. Further details of the synthesis of the compounds of the invention, including information concerning the preparation of the various starting materials, are found in the Examples which follow the description of the invention.

It is generally difficult to prepare sulfonamidophenols having two large and/or branched chain substituents on adjacent carbon atoms on the aromatic rings due to the problem of steric hindrance. Under such circumstances, it is preferred that the substituents represented by $R_1$, $R_2$, $R_3$ and $R_4$ are arranged on the benzene rings of the compounds of the invention so as to be on non-adjacent carbon atoms. While this embodiment facilitates preparation of the sulfonamidophenols of the invention, it does not affect the solubility of the compounds in the essentially water-immiscible, liquid hydrocarbon solvents or their ability to extract metal values from aqueous solution. Thus, sulfonamidophenols with substituents on vicinal carbon atoms of the benzene rings are equally effective as extractants in the process of the invention, although they are more difficult to prepare.

The process of the present invention is a liquid ion exchange process in which any one of the sulfonamidophenol compounds of the invention is dissolved in an essentially water-immiscible, liquid hydrocarbon solvent and the resulting solution is contacted with the metal containing aqueous phase to extract at least a portion of the metal values into the organic phase. The phases are then separated and metal values are stripped from the loaded organic phase by the use of an aqueous stripping medium.

A wide variety of essentially water-immiscible, liquid hydrocarbon solvents can be used in the metal recovery process of the present invention. These include: aliphatic and aromatic hydrocarbons such as kerosenes, benzene, toluene, xylene and the like. The choice of the said essentially water-immiscible liquid hydrocarbon solvent for particular commercial operations will depend on a number of factors including the design of the solvent extraction plant (i.e. mixer-settlers, Podbielniak extractors, etc.), the value of the metal being recovered, disposal of plant effluent and the like. The process of the present invention finds particular use in the extraction recovery of the major, non-ferrous, transition metals —i.e. copper, nickel and zinc, as will be described more fully hereinbelow. Essentially, all of the major plants in operation currently for the recovery of these metals (particularly $Cu++$) use mixer-settlers with relatively large organic inventories and some loss of solvent invariably occurs by evaporation, entrainment in the aqueous and the like. Under these circumstances, preferred solvents for use in the metal recovery processes of the present invention are the aliphatic and aromatic hydrocarbons having flash points of 150° F. and higher and solubilities in water of less than 0.1% by weight. These solvents are also essentially non-toxic and chemically inert and the costs thereof are currently within practical ranges—i.e. normally less than one dollar (U.S.) per gallon to as low as 30¢ (U.S.) or so. Representative commercially available solvents are Kermac 470B (an aliphatic kerosene available from Kerr-McGee—Flash Point 175° F.), Chevron Ion Exchange Solvent (available from Standard Oil of California—Flash Point 195° F.), Escaid 100 and 110 (available from Exxon-Europe—Flash Point ≅180° F.), Norpar 12 (available from Exxon-U.S.A.—Flash Point 160° F.), Conoco C-1214 (available from Conoco—Flash Point 160° F.), Aromatic 150 (an aromatic kerosene available from Exxon-U.S.A.—Flash Point 150° F.) and various other kerosenes and petroleum fractions available from other oil companies.

The present invention thus additionally relates to new compositions wherein the sulfonamido compounds of the invention are dissolved in the essentially water-immiscible, liquid hydrocarbon solvents described above. In this regard, liquid ion exchange reagents are often sold as solutions in organic solvents. These new compositions consist essentially of solutions of at least 2% by weight of the sulfonamido compound in essentially water-immiscible, liquid hydrocarbon solvents. When sold as concentrates, the solutions will preferably contain from about 25 to 75% by weight of the sulfonamido product.

In the process of the present invention, the organic solvent solutions will preferably contain from about 2 to 75% by weight of the sulfonamidophenol compounds and even more preferably from about 5 to 20% by weight thereof. Additionally, volume ratios of the organic:aqueous phase vary widely since the contacting of any quantity of the sulfonamidophenol solution with the metal containing aqueous phase will result in extraction of metal values into the organic phase. However, for commercial practicality, the organic:aqueous phase ratios are preferably in the range of about 5:1 to 1:5. For practical purposes, the extracting and stripping are normally conducted at ambient temperatures and pressures although higher or lower temperatures and/or pressures are entirely operable. Most advantageously, the entire process can be carried out continuously with the stripped organic solvent solution being recycled for contacting further quantities of metal containing solutions.

The present invention also relates to the metal complexes of the novel sulfonamido compounds and to the essentially water-immiscible, liquid hydrocarbon solvent solutions thereof. The solutions consist essentially of the said solvent and at least 2% by weight, and preferably less than 75% by weight, of the metal complexes. While not normally practiced in the industry, the solutions of the metal complexes can be obtained at one location and transported to another for stripping as hereinafter described. The term "metal complex" as used herein is meant to connote compositions of the novel sulfonamido oximes with other than insignificant quantities of metal ions. Although the exact structural nature of these complexes has not been ascertained, indications are that under conditions of maximum loading, particularly with $Cu++$ and $Zn++$ metal ions, the complexes comprise the metal and sulfonamide compound generally in a molar ratio of 1:2. Maximum loading, however, is not required for achieving acceptable performance in liquid ion exchange processes and hence the metal complexes are generally defined as including the designated metals in more than insignificant quantities up to maximum loading.

The metal recovery process of the present invention is useful for the recovery of the following metal values from their aqueous solutions: $Cu++$, $Ni++$ and $Zn++$. These metal values are all transition metals of Groups I b, II b and VIII. The extraction of these various metals from aqueous solutions depends upon a number of factors, including, for example, the concentration of the metal ion, the particular anions present, and the pH of and/or ammonia concentration in the aqueous solutions, as well as the particular sulfonamidophenol chosen and its concentration in the oganic phase. Thus, for each aqueous metal solution and sulfonamidophenol reagent solution there will be a preferred or optimum set of extraction conditions, and those skilled in the art, based on the information given herein, especially in the examples to follow, will be able with a limited number of trial runs to determine such preferred or optimum conditions for the respective systems under consideration. This is equally true of the stripping operations. By the term stripping is meant the transfer of at least a portion of the metal values in the loaded organic phase to the aqueous stripping medium. The metal values so stripped are desirably recovered from the aqueous stripping medium by conventional techniques, preferably electrolysis. The volume ratios of loaded organic:aqueous stripping phase can also vary widely. However, the overall object of the process is to provide a metal containing stripping solution of known composition and concentration suitable for conventional recovery techniques such as electrolysis. Accordingly, the metal will preferably be present in higher concentrations in the aqueous stripping medium than in the starting metal containing solution. To accomplish this, the loaded organic:aqueous stripping medium phase ratio will normally be in the range of about 1:1 to 10:1.

The aforementioned extraction parameters are generally applicable to processes for the recovery of $Cu++$, $Ni++$ and $Zn++$ metal values. According to a preferred embodiment, additional process parameters are selected to optimize recovery of particular metal values. Thus, $Cu++$ is readily extracted at acid pH's within the range of 0.5 to 7.0 and preferably within the range of 2.0 to 5.0. Copper is also readily extracted from ammoniacal solutions wherein the preferred concentration of ammonia is from about 10 to 150 g/l. The loaded organic phase is readily stripped of $Cu++$ with aqueous acid stripping solutions such as 25 to 250 g/l $H_2SO_4$.

Zinc ($Zn++$) and nickel ($Ni++$) are readily extracted from ammoniacal solutions in the same manner as $Cu++$. These metals are readily stripped from the loaded organic phases thereof with aqueous acidic stripping media, preferably 25 to 250 g/l $H_2SO_4$. As previously indicated, each aqueous metal containing solution will have its own optimum extraction conditions which will be readily apparent to those of skill in the art.

While the process of the present invention has been described as particularly effective in extracting $Cu++$, $Ni++$ and $Zn++$, metal values from aqueous solutions it may be applied to extract other chemically similar metal values, such as $Hg++$, $Ag+$, $Co++$, $Cd++$ and $Pb++$. The process of the invention thus provides a simple continuous method of extracting valuable metal values from aqueous solutions. Of equal importance is the economic advantages attendant from the process which allows the extracting reagent to be stripped of metal values and recycles for subsequent loading.

To further illustrate the various objects and advantages of the present invention, the following examples are provided. It is understood that their purpose is entirely illustrative and in no way intended to limit the scope of the invention.

EXAMPLE 1

Preparation of 2-methylbenzenesulfonamido-4-dodecylphenol

A. 2-Nitro-4-dodecylphenol

A mixture of 545 g (2.08 moles) of p-dodecylphenol, 700 ml of benzene, and 500 ml of glacial acetic acid was placed in a 5 l three-neck flask fitted with a dropping funnel, thermometer, and mechanical stirrer. The mixture was cooled to 0°–5° C. in an ice-salt bath and kept at that temperature during nitration. With stirring, 225 ml of 70% nitric acid was added slowly over 5-½ hours.

After the addition was complete, the reaction mixture was placed in a separatory funnel and washed three times with water and twice with saturated aqueous sodium chloride. In order to obtain neutrality in the aqueous phase, solid sodium bicarbonate was added accompanied by carbon dioxide evolution. After phase separation, the organic phase was stripped of volatiles by distillation under reduced pressure. Further distillation gave 422.3 g (1.38 mole) of 2-nitro-4-dodecylphenol, bpt 170°–187° C. (1–3 mm). The structure of the product was confirmed by infrared, nuclear magnetic resonance (nmr), and mass spectral analyses.

B. 2-Amino-4-dodecylphenol

A mixture of 61.4 g (0.2 moles) of 2-nitro-4-dodecylphenol and 1 g of 5% palladium on carbon slurried in 100 ml of 95% ethanol was placed in a 250 ml hydrogenation bottle. The bottle was stoppered under an atmosphere of 45 psi of hydrogen and shaken at room temperature. The hydrogen was replenished during reaction. After four hours the hydrogen uptake was complete. The mixture then was filtered through a sintered glass funnel and the filtrate was stripped of solvent under reduced pressure. The yield of product, 2-amino-4-dodecylphenol, was quantitative. Infrared, nmr and gas liquid chromatography (glc) analyses confirmed its structure and purity.

C. Preparation of 2-methylbenzenesulfonamido-4-dodecylphenol

The 15.4 g of 2-amino-4-dodecylphenol (prepared as described above) in pyridine at 0° C. was added a solution of 11.9 g of *p*-toluenesulfonyl chloride in pyridine over a period of 45 min. with stirring. The reaction was allowed to stir continuously for 72 hours while it warmed to ambient temperature.

The reaction mixture then was poured onto ice water and acidified with dilute hydrochloric acid to pH2. The oily product was dissolved in diethyl ether and washed twice with water, once with saturated sodium chloride solution, and dried over anhydrous sodium sulfate. After removal of the ether by distillation, 23 g of 2-toluene-sulfonamido-4-dodecylphenol remained. The composition of the product was confirmed by its infrared spectrum.

EXAMPLE 2

Preparation of 2-Decylmethylbenzenesulfonamido-4,6-dichlorophenol

A. Preparation of 2,4-Dichloro-6-aminophenol

A mixture of 10 g (0.048 moles) of 2,4-dichloro-6-nitrophenol and 0.2 g of 5% palladium on carbon slurried in 250 ml of glacial acetic acid was placed in a hydrogenation bottle. The bottle was stoppered under an atmosphere of 40 psi hydrogen and shaken at room temperature. The hydrogen was replenished during reaction. After four and one-half hours the hydrogen uptake was complete. The mixture then was filtered through a sintered glass funnel and the filtrate was stripped of solvent under reduced pressure. The yield of product was quantitative.

B. Preparation of 2-Decylmethylbenzenesulfonamido-4,6-dichlorophenol

The product from the above example was mixed with 86 ml of pyridine and cooled to 10°–15° C. in a 250 ml flask fitted with a stirrer, thermometer, condenser, and addition funnel. Decylmethylbenzene sulfonyl chloride (14.9 g, 0.45 moles) was added to the stirred mixture over 45 minutes while maintaining the temperature at 10°–15° C. The reaction mixture was allowed to warm to room temperature for two hours, then heated to 80° C. and held for one and one-half hours. The reaction mixture then was cooled to room temperature and hexane was added. The reaction then was washed twice with successive portions of 10% aqueous hydrochloric acid, twice with water and finally dried over anhydrous sodium sulfate. Evaporation of volatiles under reduced pressure left 19.7 g of product (2-decylmethylbenzenesulfonamido-4,6-dichlorophenol), whose structure was confirmed by infrared and nuclear magnetic resonance.

EXAMPLE 3

Preparation of 2-Decylmethylbenzenesulfonamidoanisole

In order to illustrate and compare the metal value extraction effectiveness of sulfonamidoanisoles to the sulfonamidophenols of the invention, 2-decylmethylbenzenesulfonamidoanisole was prepared as follows:

A one liter flask, fitted with a stirrer, condenser, addition funnel, and thermometer, was charged with 43.1 g (0.35 mole) of o-anisidine and 370 ml of pyridine and cooled to 10°–15° C. The decylmethylbenzenesulfonyl chloride was then added over 45 minutes at 10°–15° C. with stirring. The stirred reaction mixture was allowed to warm to room temperature for two hours and then heated at 80 C. for one and one-half hours. The reaction mixture then was cooled to about 30° C. and was transferred to a separatory funnel with 300 ml of heptane. The organic phase was washed twice with 10% aqueous hydrochloric acid and twice with water, using small additions of methanol to break emulsions which occurred subsequent to the second water wash. After separation of phases, the organic layer was dried over anhydrous sodium sulfate. Volatiles then were removed by evaporation under reduced pressure leaving 132.2 g of product (2-decylmethylbenzenesulfonamidoanisole), whose structure was confirmed by infrared and nuclear magnetic resonance.

Tests revealed that the compound was a very poor extractant for metal values from aqueous solutions. Analysis of the organic phase after extraction showed no detectable concentrations of metal ions.

EXAMPLE 4

Extraction of Copper by 2-decylmethylbenzenesulfonamido-4,6-dichlorophenol

A 0.1 molar solution of 2-decylmethylbenzenesulfonamido-4,6-dichlorophenol in Kermac 470-B was prepared. Portions of the organic solution were then shaken with aqueous solutions at an organic:aqueous phase volume ratio of 1:1 for an hour at ambient temperature. The aqueous solutions consisted of equivolumes of the following two components:

Component A: A 0.2 molar copper sulfate solution in water;

Component B: Water or sulfuric acid or sodium hydroxide solutions ranging from 0.01 to 0.1 molar, depending upon the desired pH of the raffinate. Several extractions were performed at varying pH values. By analyzing the organic phase for metal concentration and the aqueous phase for pH, the following data was obtained demonstrating the degree of metal extraction as a function of pH for copper.

| [Cu] organic | pH aqueous raffinate |
| --- | --- |
| 0.01 gpl | 2.2 |
| 0.03 gpl | 3.2 |
| 1.13 gpl | 3.9 |
| 1.33 gpl | 4.2 |
| 1.90 gpl | 4.3 |

EXAMPLE 5

Extraction of Zinc by 2-decylmethylbenzenesulfonamido-4,6-dichlorophenol

A 0.1 molar solution of 2-decylmethylbenzenesulfonamido-4,6-dichlorophenol in Kermac 470-B was prepared. Portions of the organic solution were then shaken with aqueous ammoniacal solutions at an organic:aqueous phase volume ratio of 1:1 for an hour at ambient temperature. The aqueous solutions contained 0.005 molar zinc sulfate and a constant ratio of $NH_3/NH_4$ of 2/1. Several extractions were performed for varying $NH_3$ concentrations. By analyzing the organic phase for metal concentration and the aqueous phase for $NH_3$ concentration, the following data was obtained demonstrating the degree of metal extraction as a function of ammonia concentration for zinc.

| [Zn] organic | % Extraction | [NH₃] aqueous |
| --- | --- | --- |
| 0.32 gpl | 97 | 14.4 gpl |
| 0.25 gpl | 76 | 28.9 gpl |
| 0.32 gpl | 97 | 58.3 gpl |
| 0.29 gpl | 88 | 87.2 gpl |
| 0.32 gpl | 97 | 116.2 gpl |
| 0.23 gpl | 70 | 147.0 gpl | utes. The phases were separated. The organic was washed twice with 2-5% sodium hydroxide, once with brine, and the excess aromatic was stripped off in vacuo. The product was fractionally distilled through a Vigreaux column under vacuum. The ratio of reactants, boiling points, and yields can be found in Table A.

TABLE A
FRIEDEL-CRAFTS ALKYLATIONS

| PROUDCT | RUN | AROMATIC HYDROCARBON | OLEFIN | AlCl₃ | REACTION TEMP. °C. | BOILING POINT mm of Hg | BOILING POINT °C. | YIELD % |
| --- | --- | --- | --- | --- | --- | --- | --- | --- |
| Decyltoluene | A | Toluene 5m | 1-Decene 1m | 0.05m | 40 | 0.45 | 95-100 | 67 |
| (Decylmethylbenzene) | B | Toluene 10m | 1-Decene 1m | 0.025m | 0-5 | * | 150-155 | 79 |
|  | C | Toluene 5m | 1-Decene 0.5m | 0.025m | 40 | 0.15 | 80-85 | 73 |
|  | D | Toluene 71.4m | 1-Decene 7.6m | 0.357m | 40 | 0.55-0.8 | 106-124 | 76 |

*Water aspirator vacuum

EXAMPLE 6

Extraction of Metal Values by 2-methylbenzenesulfonamido-4-dodecylphenol

Portions of a 0.1 molar solution of 2-methylbenzenesulfonamido-4-dodecylphenol in Napoleum 470 was shaken with aqueous ammoniacal solutions of metal sulfates at an organic:aqueous phase volume ratio of 1:1 for 24 hours at ambient temperature. Total ammonia concentration in the aqueous phase was always approximately 10 gpl. The following data demonstrate the extent of extraction for various metal values:

| Metal | Org | Aq |
| --- | --- | --- |
| Cu | 3.15 gpl | 0.00 gpl |
| Ni | 2.45 gpl | 0.45 gpl |
| Zn | 3.09 gpl | 0.11 gpl |

EXAMPLE 7

Preparation of Starting Materials

A. Friedel-Crafts Alkylations

The alkylations were carried out via the procedure of Oleson (Ind. Eng. Chem., 52, 833 (1960).

Approximately one-half to two-thirds of the starting aromatic hydrocarbon and the aluminum chloride were placed in a round bottom three-neck flask fitted with mechanical stirrer, addition funnel, thermocouple well or thermometer, and a condenser. A small portion of water (2 to 10 drops) were added. A solution of the olefin in the remainder of the aromatic hydrocarbon was added slowly with stirring to the reaction vessel. The reaction temperature was maintained somewhere in the range from 0° C. to 50° C. After addition was complete, the reaction mixture was stirred for an additional 15 to 20 minutes while the reaction temperature was maintained. A 10% hydrochloric acid solution (500 ml) was added and the mixture was stirred for 5 min- B. Preparation of the sulfonyl chloride The sulfonyl chlorides were prepared by two different routes starting from either the alkylbenzene or the alkylbenzenesulfonic acid.

Alkylbenzenesulfonyl chloride from the alkylbenzene

A solution of the alkylbenzene in 1,1,2-trichloroethane (TCE) was cooled to 10° C. and chlorosulfonic acid was added slowly with stirring. The pot temperature was maintained at 10°-15° C. during the addition. After the addition was complete, the reaction mixture was stirred at 10°-15° C. for 15 minutes and then allowed to warm to ambient temperature while stirring for 2-3 hours. The thionyl chloride was added to the stirring reaction mixture. The reaction mixture was heated slowly (1-3 hours) to 90°-120° C. and then held at 90°-120° C. for 30 minutes. A sample was then withdrawn from the reaction mixture. If the presence of the sulfonic acid anhydride was detected by IR, an additional mole of thionyl chloride was added and the reaction mixture was stirred at 90°-120° C. for one additional hour. The excess thionyl chloride and TCE were stripped from the reaction mixture in vacuo. The crude sulfonyl chloride was purified by molecular distillation. Ratios of reactants, reaction temperatures, and yields are given in Table B.

Dodecylbenzenesulfonyl chlorides from the dodecylbenzenesulfonic acids

The sulfonic acid was added slowly over a four-hour period to a stirring solution of thionyl chloride (1 l.) in Skelly C (500 ml). The temperature controller was set for 95° C. and the reaction mixture was heated to reflux. The reaction mixture required approximately two hours to reach 95° C. After stirring at 95° C. overnight, the excess thionyl chloride and Skelly C were stripped off under aspirator vacuum. An additional 50 ml of Skelly C was added and then distilled off under aspirator vacuum to remove the last traces of thionyl chloride. The crude product was then purified by molecular distillation. Amounts of starting acid and yields are given in Table C.

TABLE B
PREPARATION OF ALKYLBENZENESULFONYL CHLORIDES FROM THE ALKYLBENZENE

| PRODUCT | RUN | ALKYL-BENZENE (m) | ClSO₃H (m) | SOCl₂ (m) | TCE (ml) | RXN TEMP °C. | DISTILLED YIELD (%) |
|---|---|---|---|---|---|---|---|
| Dodecylbenzenesulfonyl chloride | | 4.34 | 4.34 | 8.68 | 3.67 | 110 | 64 |
| Decylmethylbenzene-sulfonyl chloride | A | 5.87 | 5.87 | 11.74 | 500 | 120 | 67 |
| | B | 5.53 | 5.53 | 11.07 | 442 | 110 | 73 |
| | C | 0.25 | 0.275 | 0.55 | 10 | 116 | 56 |

TABLE C
CONVERSION OF SULFONIC ACIDS BY THIONYL CHLORIDE

| PRODUCT | ACID (m) | CRUDE % | DISTILLED (%) |
|---|---|---|---|
| Dodecylbenzenesulfonyl chloride | 5.82 | — | 94 |

While the invention has now been described in terms of various preferred process parameters, and exemplified with respect thereto, the skilled artisan will appreciate that various substitutions, changes, omissions, and modifications may be made without departing from the spirit thereof. Accordingly, it is intended that the scope of the invention be limited solely by that of the following claims.

The embodiments of the invention in which an exclusive property or privilege is claimed are defined as follows:

1. Compounds of the structure:

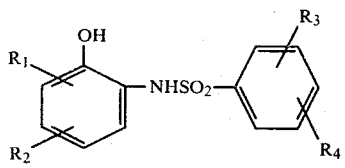

wherein $R_1$ and $R_2$, which may be the same or different, are selected from the group consisting of hydrogen, linear and branched chain alkyl and alkenyl containing from 1 to 20 carbon atoms, halogen, nitro, cyano, trifluoromethyl and methylsulfonyl, with the proviso that both $R_1$ and $R_2$ are not alkyl, and $R_3$ and $R_4$, which may be the same or different, are selected from the group consisting of hydrogen and linear and branched chain alkyl and alkenyl containing from 1 to 20 carbon atoms, said compounds being further characterized as having solubilities of at least 2% by weight in essentially water-immiscible liquid hydrocarbon solvents.

2. The compounds of claim 1, wherein the substituents represented by $R_1$, $R_2$, $R_3$ and $R_4$ are on non-adjacent carbon atoms.

3. The compounds of claim 1, wherein the sum of the carbon atoms in the alkkyl and alkenyl substituents is at least 8.

4. The compounds of claim 1, wherein one of $R_1$ and $R_2$ is dodecyl.

5. The compounds of claim 1, wherein said linear and branched chain alkyl and alkenyl contain at least 8 carbon atoms.

6. The compounds of claim 5, wherein said alkyl and alkenyl are branched chain.

7. The compounds of claim 1, wherein at least one of $R_3$ and $R_4$ is a linear or branched chain alkyl containing at least 8 carbon atoms.

8. The compounds of claim 7, wherein said alkyl is branched chain.

9. The compounds of claim 7, wherein one of $R_3$ and $R_4$ is dodecyl.

10. The compounds of claim 7, wherein one of $R_3$ and $R_4$ is decyl.

11. The compounds of claim 1, wherein one of $R_3$ and $R_4$ is methyl.

12. The compounds of claim 1, wherein at least one of $R_1$ and $R_2$ is halogen.

13. The compounds of claim 12, wherein said halogen is chloro.

14. The compounds of claim 1, wherein one of $R_3$ and $R_4$ is decyl and the other is methyl.

15. 2-decylmethylbenzenesulfonamido-4,6-dichlorophenol.

16. The compounds of claim 1, characterized as having solubilities of at least 2% by weight in essentially water-immiscible liquid hydrocarbon solvents selected from the group consisting of aliphatic and aromatic hydrocarbons and mixtures thereof having flash points of at least 150° F. and further characterized in that the Cu++ complexes thereof also have solubilities of at least 2% by weight in said liquid hydrocarbon solvents.

17. A composition of matter consisting essentially of a solution of sulfonamidophenol in an essentially water-immiscible liquid hydrocarbon solvent, said solution containing at least 2% by weight of said sulonamidophenol, said sulfonamidophenol being selected from compounds of structure:

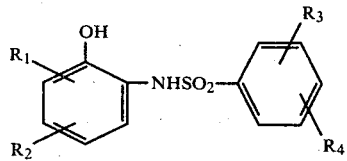

wherein $R_1$ and $R_2$, which may be the same or different, are selected from the group consisting of hydrogen, linear and branched chain alkyl and alkenyl containing from 1 to 20 carbon atoms, halogen, nitro, cyano, trifluoromethyl, and methylsulfonyl, with the proviso that both $R_1$ and $R_2$ are not alkyl and $R_3$ and $R_4$, which may be the same or different, are selected from the group consisting of hydrogen and linear and branched chain alkyl and alkenyl containing from 1 to 20 carbon atoms.

18. The composition of claim 17, wherein said solvent is selected from the group consisting of aliphatic and aromatic hydrocarbons and mixtures thereof, having flash points of at least 150° F. and further characterized in that the Cu++ complexes of the sulfonamidophenol have a solubility in said solvent of at least 2% by weight.

19. The composition of claim 17, wherein said solvent is selected from the group consisting of aliphatic and aromatic kerosenes, benzene, toluene and xylene.

20. The composition of claim 17, wherein said sulfonamidophenol is present in an amount of about 2 to 75% by weight.

21. The composition of claim 17, wherein one of $R_1$ and $R_2$ is dodecyl.

22. The composition of claim 17, wherein said linear and branched chain alkyl and alkenyl contain at least 8 carbon atoms.

23. The composition of claim 22, wherein said alkyl and alkenyl are branched chain.

24. The composition of claim 17, wherein at least one of $R_3$ and $R_4$ is a linear or branched chain alkyl containing at least 8 carbon atoms.

25. The composition of claim 24, wherein said alkyl is branched chain.

26. The composition of claim 26, wherein one of $R_3$ and $R_4$ is dodecyl.

27. The composition of claim 24, wherein one of $R_3$ and $R_4$ is decyl.

28. The composition of claim 17, wherein one of $R_3$ and $R_4$ is methyl.

29. The composition of claim 17, wherein at least one of $R_1$ and $R_2$ is halogen.

30. The composition of claim 29, wherein said halogen is chloro.

31. The composition of claim 17, wherein one of $R_3$ and $R_4$ is decyl and the other is methyl.

32. The composition of claim 17, wherein said sulfonamidophenol is 2-decylmethylbenzenesulfonamido-4,6-dichlorophenol.

* * * * *

UNITED STATES PATENT AND TRADEMARK OFFICE
CERTIFICATE OF CORRECTION

PATENT NO. : 4,239,699
DATED : 12/16/80
INVENTOR(S) : Kenneth D. MacKay

It is certified that error appears in the above-identified patent and that said Letters Patent are hereby corrected as shown below:

In column 2, line 36; "from 1 to 120 carbon atoms" should read --from 1 to 20 carbon atoms --.

In column 3, line 29; "salt of alkyl" should read -- salt or alkyl --.

In column 6, line 20; "recycles" should read --recycled--.

In column 7, line 4; "The" should read --To--.

In column 11, line 60; "alkkyl" should read --alkyl --.

In column 12, line 44; "sulonamido-" should read -- sulfonamido- --

Signed and Sealed this

Nineteenth Day of March 1985

[SEAL]

Attest:

DONALD J. QUIGG

Attesting Officer     Acting Commissioner of Patents and Trademarks